United States Patent
Pedersen et al.

(10) Patent No.: US 11,014,604 B2
(45) Date of Patent: May 25, 2021

(54) HYDRAULIC STEERING ARRANGEMENT

(71) Applicant: Danfoss Power Solutions ApS, Nordborg (DK)

(72) Inventors: Soren Pedersen, Nordborg (DK); Morten Bruhn, Nordborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 278 days.

(21) Appl. No.: 16/265,155

(22) Filed: Feb. 1, 2019

(65) Prior Publication Data

US 2019/0241212 A1    Aug. 8, 2019

(30) Foreign Application Priority Data

Feb. 5, 2018   (DE) .................. 102018102465.7

(51) Int. Cl.
| | | |
|---|---|---|
| *B62D 5/093* | (2006.01) | |
| *B62D 3/14* | (2006.01) | |
| *B62D 1/22* | (2006.01) | |
| *B62D 5/32* | (2006.01) | |

(52) U.S. Cl.
CPC .............. *B62D 5/093* (2013.01); *B62D 1/22* (2013.01); *B62D 3/14* (2013.01); *B62D 5/32* (2013.01)

(58) Field of Classification Search
CPC . B62D 5/093; B62D 1/22; B62D 3/14; B62D 5/32
See application file for complete search history.

(56) References Cited

U.S. PATENT DOCUMENTS

| | | | | |
|---|---|---|---|---|
| D839,803 S | * | 2/2019 | Kanbargi | .............. D12/177 |
| 2020/0198698 A1 | * | 6/2020 | Kiran | .............. B62D 5/10 |
| 2020/0216112 A1 | * | 7/2020 | Emmert | ............. B62D 1/22 |
| 2020/0284275 A1 | * | 9/2020 | Butler | ............ F16H 61/4192 |
| 2020/0317260 A1 | * | 10/2020 | Petersen | ............. B62D 5/06 |

FOREIGN PATENT DOCUMENTS

| | | |
|---|---|---|
| CN | 101233040 A | 7/2008 |
| CN | 203681648 U | 7/2014 |
| CN | 104097686 A | 10/2014 |
| CN | 106114609 A | 11/2016 |
| CN | 106476885 A | 3/2017 |
| CN | 106741157 A | 5/2017 |

(Continued)

OTHER PUBLICATIONS

First Examination Report for Indian Patent Application No. 201914001052 dated Nov. 26, 2020.

*Primary Examiner* — Jacob B Meyer
*Assistant Examiner* — Sophia Marie McGuire
(74) *Attorney, Agent, or Firm* — McCormick, Paulding & Huber PLLC

(57) ABSTRACT

A hydraulic steering arrangement (1) is described comprising a supply port arrangement having a pressure port (P) and tank port (T), a working port arrangement having two working ports (L, R), a steering unit (2) arranged between the supply port arrangement and the working port arrangement and a steering valve (3) arranged between the supply port arrangement and the working port arrangement. Such a steering arrangement should have a safety means. To this end in a manual steering mode the steering valve (3) is connected to the working port arrangement through the steering unit (2).

20 Claims, 1 Drawing Sheet

(56) References Cited

FOREIGN PATENT DOCUMENTS

| | | |
|---|---|---|
| CN | 107284522 A | 10/2017 |
| DE | 102005033576 A1 | 2/2007 |
| DE | 102007053024 B4 | 3/2010 |
| EP | 3 031 699 A2 | 5/2016 |
| EP | 2762387 B1 | 11/2016 |
| EP | 3 173 311 A1 | 5/2017 |

* cited by examiner

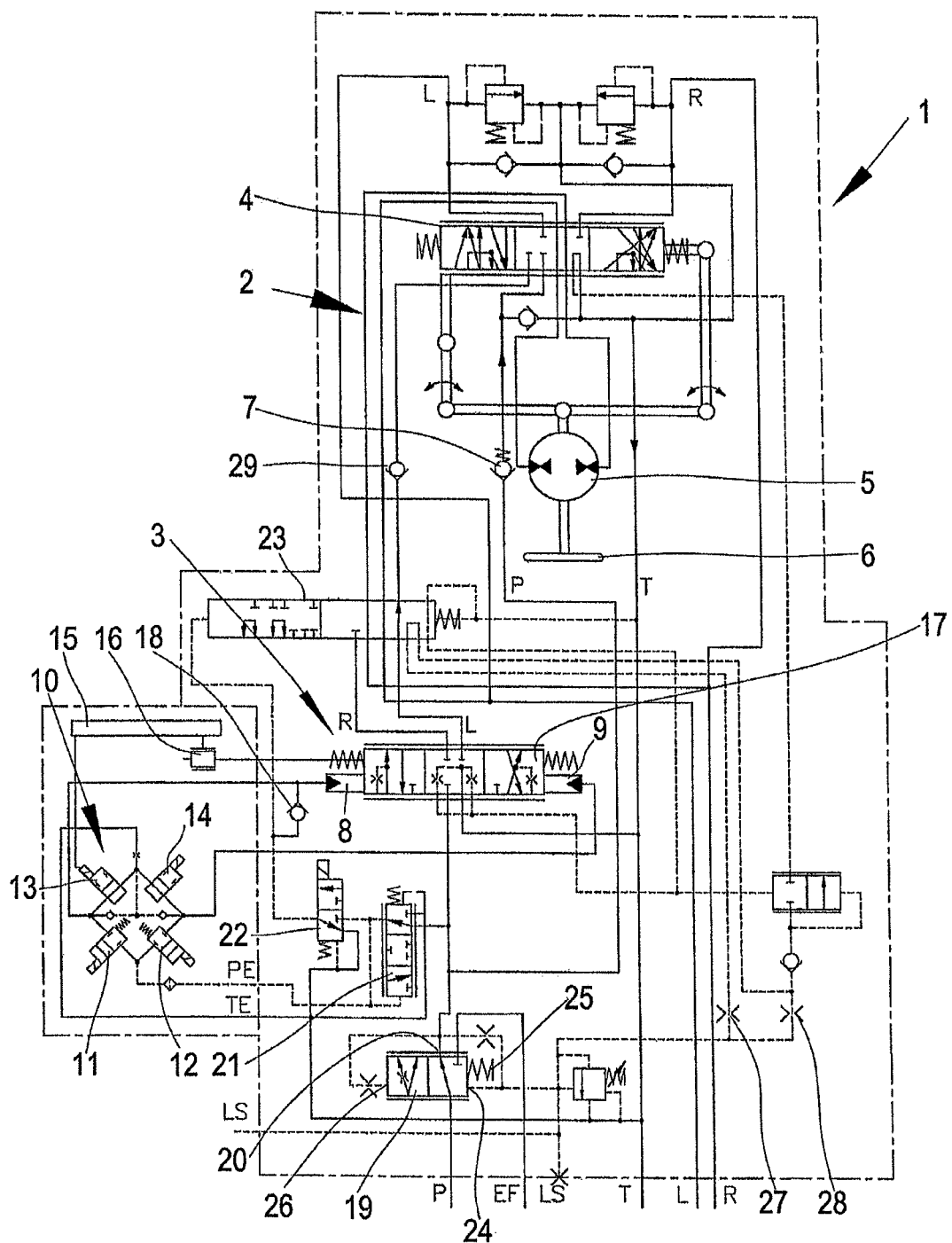

_HYDRAULIC STEERING ARRANGEMENT_

CROSS-REFERENCE TO RELATED APPLICATION

This application claims foreign priority benefits under U.S.C. § 119 to German Patent Application No. 102018102465.7 filed on Feb. 5, 2018, the content of which is hereby incorporated by reference in its entirety.

TECHNICAL FIELD

The present invention relates to a hydraulic steering arrangement comprising a supply port arrangement having a pressure port and a tank port, a working port arrangement having two working ports, a steering unit arranged between the supply port arrangement and the working port arrangement and a steering valve arranged between the supply port arrangement and the working port arrangement.

BACKGROUND

Such a hydraulic steering arrangement is known, for example, from EP 2 762 387 B1 or DE 10 2007 053 024 B4.

Such a steering arrangement can be operated in a manual steering mode in which the steering unit is operated by a steering wheel which can be actuated by a driver. When the steering wheel is rotated to the left, the vehicle steered with such a steering arrangement is steered to the left. When the steering wheel is rotated to the right, the steered vehicle is steered to the right.

A steering unit usually comprises a directional valve and a measuring motor. The directional valve can be formed of a sleeve and a spool which can be rotated relatively to each other in order to open some orifices and to close other orifices. The hydraulic fluid flowing from the supply port arrangement to the working port arrangement flows through the measuring motor. The measuring motor in turn rotates back spool and sleeve to the original position once the necessary amount of hydraulic fluid has been supplied to a steering motor connected to the working port arrangement.

The steering valve can be used to additionally supply hydraulic fluid to the working port arrangement, of course in a controlled manner. When the steering unit is used for steering the vehicle, this is called the "manual steering mode".

In addition, the steering valve can be used to automatically steer the vehicle, for example using GPS data. Accordingly, a mode in which the vehicle is steered exclusively by means of the steering valve is called "automatic steering mode".

A problem can arise when the steering valve has a malfunction or is defect, for example when it sticks. In such a situation there is a risk that the steering behavior of the vehicle runs out of control.

SUMMARY

The object underlying the invention is to have a hydraulic steering arrangement with a safety feature.

This object is solved with a steering arrangement as described at the outset in that in a manual steering mode the steering valve is connected to the working port arrangement through the steering unit.

In this way the flow to the working port arrangement is controlled through the hydraulic steering unit. Accordingly, the driver is fully in control of the steering behavior of the vehicle through the hydraulic steering unit and the risk for failure in relation to hydraulic fluid from the steering valve is dramatically reduced. Even if the steering valve supplies hydraulic fluid from the supply port arrangement, the driver can control the amount of fluid supplied to the working port arrangement.

In an embodiment of the invention in manual steering mode the steering valve outlet flow is allowed in one direction and blocked in the other direction by means of a cut-off valve. This is a simple solution to have full control over the amount of fluid delivered by the steering valve in the manual steering mode.

In an embodiment of the invention in manual steering mode reverse steering flow through the steering valve is prevented by means of a check valve. This is an additional safety mean in case of unintended steering valve direction.

In an embodiment of the invention a switch valve is provided limiting the operation of the steering valve, wherein diagnostic coverage of the switch valve may be achieved by means of a check valve. In the unpowered state of the switch valve the steering valve can be moved in one direction only. In the powered state of the switch valve the steering valve can be moved in both directions. The movement of the steering valve can be verified by means of a position sensor. A correct relationship between powered and unpowered state is evidence of correct switch valve operation.

In an embodiment of the invention in the manual steering mode the steering valve can be operated in one direction only. In other words, only one side of the steering valve is used in the manual steering mode and this side is the same when the driver steers to left or to right. This simplifies the arrangement of the respective channels which are necessary to provide for a flow path for the hydraulic fluid.

In an embodiment of the invention the steering valve is a hydraulically operated valve having two control ports wherein one control port is connected to a check valve opening in a direction away from the control port. When the output side of the check valve is connected to a lower pressure, no pressure can be built up at the control port of the steering valve connected to the check valve. On the other hand, when the output side of the check valve is loaded with a higher pressure so that it cannot open, the steering valve can be operated in both directions, which is required in the automatic steering mode.

In an embodiment of the invention a cut-off valve is arranged between the steering valve and the steering unit, wherein in an automatic steering mode the cut-off valve interrupts a flow path between the steering valve and the steering unit and interrupts a reaction flow path between the steering valve and the working port arrangement. In the automatic steering mode the vehicle is steered under the control of the steering valve only. Accordingly, no flow through the steering unit is desired.

In an embodiment of the invention in the automatic steering mode the cut-off valve interrupts a reaction flow path from the steering unit to the working port arrangement. In this way the steering unit is completely isolated from the working port arrangement.

In an embodiment of the invention in the automatic steering mode the cut-off valve interrupts a flow path through a first load sensing bleed which in the manual steering mode is arranged in parallel to a second load sensing bleed, wherein the load sensing bleeds are connected to a load sensing port. The load sensing bleeds are used to create a load sensing pressure at the load sensing port. This load sensing pressure is, for example, used to control a position or an opening degree of a priority valve. In the manual steering mode, for example on road, it is of advantage to limit the flow capacity and accordingly, the load sensing pressure is lowered. However, in the automatic steering mode it is of advantage to have a higher load sensing pressure to open the priority valve to a larger extend. In this case only one load sensing bleed is used to create the load sensing pressure. Since a parallel connection of two load sensing bleeds has a lower throttling resistance than only one single load sensing bleed, this is a simple way to manipulate the load sensing pressure, which forms for example, the standby pressure for the priority valve.

In an embodiment of the invention in manual steering mode a load sensing pressure from the steering valve is relieved to tank pressure. The load sensing pressure is influenced by the steering unit only.

In an embodiment of the invention in the manual steering mode the steering valve forms a first variable orifice connected in series through the cut-off valve and a check valve through a second variable orifice in the directional valve. The resulting throttling resistance covers an additional fluid amount directed to the working port arrangement.

BRIEF DESCRIPTION OF THE DRAWINGS

An embodiment of the invention is now described in more detail with reference to the drawing, in which:

the only FIG. shows a hydraulic diagram of a hydraulic steering arrangement.

DETAILED DESCRIPTION

A hydraulic steering arrangement 1 comprises a supply port arrangement having a pressure port P and a tank port T, a working port arrangement having two working ports L, R, a steering unit 2 arranged between the supply port arrangement P, T and the working port arrangement L, R and a steering valve 3 arranged between the supply port arrangement P, T and the working port arrangement L, R.

The steering unit 2 comprises a directional valve 4 and a measuring motor 5. The directional valve 4 comprises a spool and a sleeve which can be rotated relatively to each other to open some orifices and to close some other orifices. The rotation of spool and sleeve relatively to each other is caused by means of a steering wheel 6. Hydraulic fluid flowing from the pressure port P to one of the working ports L, R runs through the measuring motor 5 and drives the measuring motor. The measuring motor 5 in turn rotates back spool and sleeve to the original or neutral position once the necessary amount of hydraulic fluid has been supplied to the respective working port.

The directional valve 4 is connected to the pressure port P by means of a check valve 7 opening in a direction towards the directional valve 4.

The steering valve 3 is a hydraulically operated valve having two control ports 8, 9 which are connected to a bridge 10 of pilot valves 11-14. The pilot valves 11-14 are controlled by means of a controller 15 which is connected to a position sensor 16 detecting a position of a valve element 17 of the steering valve 3.

The right control port 8 is connected to a check valve 18 opening away from the right control port 8. The function of check valve 18 will be explained later.

The pressure port P is connected to a priority valve 19. A priority output 20 of the priority valve 19 is connected to the steering valve 3 and to the steering unit 2. Furthermore, the priority valve 19 comprises a secondary output connected to a port EF.

The priority output 20 of the priority valve 19 is connected to a pressure control valve 21 which adjusts a pressure at its output to be, for example, 12 bar. This pressure is supplied to the bridge 10 of the pilot valves 11-14 provided that a switch valve 22 has been switched to the position not shown. In the position shown, the switch valve 22 connects the check valve 18 to the tank port T so that at the output of the check valve 18 there is only a pressure corresponding to the tank pressure. It is therefore not possible to built-up a pressure at the right control port 8 which would be able to shift the valve element 17 of the steering valve 3 to a right steering position. It is only possible to shift the valve element 17 of the steering valve 3 in a left steering position.

Through the presence of check valve 18 a diagnostic coverage may be achieved for correct operation of switch valve 22. When switch valve 22 is powered off the valve element 17 of the steering valve 3 cannot be shifted to the right steering position. This is verified by means of the position sensor 16. When switch valve 22 is powered on the valve element 17 can be shifted to the right steering position. Again, this is verified by means of the position sensor 16. When expected behavior of the valve element 17 is observed, it may be concluded that switch valve 22 operation is correct.

The steering arrangement 1 can be operated in a "manual steering mode" and in an "automatic steering mode". In the manual steering mode steering is performed under control of the steering wheel 6 by means of the steering unit 2. In the manual steering mode additional hydraulic fluid can be supplied to the working port arrangement L, R via the steering valve 3, however in a controlled manner.

In the automatic steering mode steering of the vehicle is performed exclusively by means of the steering valve 3.

A cut-off valve 23 is used to switch between these two steering modes.

The drawing shows the cut-off valve 23 in the manual steering mode.

As can be seen in the drawing, in the manual steering mode the steering valve 3 is connected to the working port arrangement L, R through the steering unit 2 only, i.e. a flow path from the steering valve 3 to one of the working ports L, R runs through the directional valve 4. Accordingly, the driver of the vehicle is fully in control of the steering behavior of the vehicle, even if the steering valve 3 has a malfunction. In the manual steering mode the cut-off valve 23 connects the steering valve 3 and the directional valve 4 and connects the reaction flow path and the working port arrangement L, R.

In the automatic steering mode the cut-off valve 23 interrupts the connection between the steering valve 3 and the steering unit 2 and interrupts as well a reaction flow path connection between the steering unit 2 and the working port arrangement L, R.

The cut-off valve is hydraulically actuated by the switch valve 22, i.e. when the switch valve 22 changes its position from the position shown to a position in which it connects the pressure control valve 21 to the output of the check valve 18 it shifts at the same time the cut-off valve 23 to the position belonging to the automatic steering mode.

When the switch valve 22 has been switched, the pressure on the ball side of the check valve 18 is higher than the pressure at control port 8 so that the check valve 18 can no longer open. In this situation it is possible to control by means of the bridge 10 pressures at both control ports 8, 9 of the steering valve 3 so that the steering valve 3 can be used to be operated in both directions.

The steering arrangement 1 comprises furthermore a load sensing port LS. The load sensing port LS is connected to a control port 24 of the priority valve 19. It is used, for example, to adjust the position of the priority valve 19, i.e. to determine the flow capacity of the priority valve 19. The priority valve 19 comprises furthermore a spring 25 which, for example, corresponds to a pressure of 7 bar. The priority valve 19 has a further control port 26 which is like the control port 24 connected to the priority output 20 so that a valve element of the priority valve 19 will assume a position which is adjusted by the difference between the pressures at the control ports 24, 26 and the force of spring 25.

In the manual steering mode the load sensing port LS is connected to the steering unit 2 via a first load sensing bleed 27 and a second load sensing bleed 28 which are connected in parallel. However, in the automatic steering mode the cut-off valve 23 interrupts the flow path through the first LS bleed so that the load sensing pressure at the load sensing port LS is slightly changed. This is used for manipulating the standby pressure for the priority valve 19. In the manual steering mode the flow capacity through the priority valve 19 is limited.

The steering arrangement 1 can at least partly be checked in a simple manner. To this end in the manual steering mode the controller 15 tries to activate the steering valve 3 by pressurizing the right control port 8. If this is possible although the switch valve 22 is in the position shown, this is an indication of a malfunction.

The steering valve 3 is connected to the steering unit 2 by means of a check valve 29 opening in a direction towards the steering unit 2. This means that in manual steering mode reverse steering flow through the steering valve 3 is prevented by means of the check valve 29, for example in case of unintended steering valve direction.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a supply port arrangement having a pressure port and a tank port, a working port arrangement having two working ports, a steering unit arranged between the supply port arrangement and the working port arrangement and a steering valve arranged between the supply port arrangement and the working port arrangement, wherein in a manual steering mode the steering valve is connected to the working port arrangement through the steering unit, wherein a cut-off valve is arranged between the steering valve and the steering unit, and wherein in the manual steering mode the steering valve is connected to the steering unit through the cut-off valve.

2. The steering arrangement according to claim 1, wherein in manual steering mode the steering valve outlet flow is allowed in one direction and blocked in the other direction by means of the cut-off valve.

3. The steering arrangement according to claim 2, wherein in manual steering mode reverse steering flow through the steering valve is prevented by means of a check valve.

4. The steering arrangement according to claim 2, wherein a switch valve is provided limiting the operation of the steering valve, wherein diagnostic coverage of the switch valve may be achieved by means of a check valve.

5. The steering arrangement according to claim 1, wherein in the manual steering mode the steering valve can be operated in one direction only.

6. The steering arrangement according to claim 5, wherein the steering valve is a hydraulically operated valve having two control ports, wherein one control port is connected to a check valve opening in a direction away from the control port.

7. The steering arrangement according to claim 1, wherein in an automatic steering mode the cut-off valve interrupts a flow path between the steering valve and the steering unit and establishes a flow path between the steering valve and the working port arrangement.

8. The steering arrangement according to claim 7, wherein in the automatic steering mode the cut-off valve interrupts a flow path from the steering unit to the working port arrangement.

9. The steering arrangement according to claim 7, wherein in the automatic steering mode the cut-off valve interrupts a flow path through a first load sensing bleed which in the manual steering mode is arranged in parallel to a second load sensing bleed, wherein the load sensing bleeds are connected to a load sensing port.

10. The steering arrangement according to claim 1, wherein in manual steering mode a load sensing pressure from steering valve is released to tank pressure.

11. The steering arrangement according to claim 10, wherein in manual steering mode the steering valve forms a first variable orifice connected in series through the cut-off valve and check valve to a second variable orifice in directional valve.

12. The steering arrangement according to claim 3 wherein a switch valve is provided limiting the operation of the steering valve, wherein diagnostic coverage of the switch valve may be achieved by means of a check valve.

13. The steering arrangement according to claim 2, wherein in the manual steering mode the steering valve can be operated in one direction only.

14. The steering arrangement according to claim 3, wherein in the manual steering mode the steering valve can be operated in one direction only.

15. The steering arrangement according to claim 4, wherein in the manual steering mode the steering valve can be operated in one direction only.

16. The steering arrangement according to claim 2, wherein in an automatic steering mode the cut-off valve interrupts a flow path between the steering valve and the steering unit and establishes a flow path between the steering valve and the working port arrangement.

17. The steering arrangement according to claim 3, wherein in an automatic steering mode the cut-off valve interrupts a flow path between the steering valve and the steering unit and establishes a flow path between the steering valve and the working port arrangement.

18. The steering arrangement according to claim 4, wherein in an automatic steering mode the cut-off valve interrupts a flow path between the steering valve and the steering unit and establishes a flow path between the steering valve and the working port arrangement.

19. The steering arrangement according to claim 5, wherein in an automatic steering mode the cut-off valve interrupts a flow path between the steering valve and the steering unit and establishes a flow path between the steering valve and the working port arrangement.

20. The steering arrangement according to claim 6, wherein in an automatic steering mode the cut-off valve interrupts a flow path between the steering valve and the steering unit and establishes a flow path between the steering valve and the working port arrangement.

\* \* \* \* \*